(12) United States Patent
Keci

(10) Patent No.: US 9,902,454 B1
(45) Date of Patent: Feb. 27, 2018

(54) FOLDABLE VELOCIPEDE

(71) Applicant: Rajmond Keci, Clearwater, FL (US)

(72) Inventor: Rajmond Keci, Clearwater, FL (US)

( * ) Notice: Subject to any disclaimer, the term of this patent is extended or adjusted under 35 U.S.C. 154(b) by 0 days.

(21) Appl. No.: 15/347,976

(22) Filed: Nov. 10, 2016

(51) Int. Cl.
*B62K 15/00* (2006.01)
*B62K 19/18* (2006.01)

(52) U.S. Cl.
CPC ............ *B62K 15/006* (2013.01); *B62K 19/18* (2013.01); *B60Y 2200/13* (2013.01)

(58) Field of Classification Search
CPC .... B62K 15/00; B62K 15/006; B62K 15/008; B62K 2015/003; B62M 6/90; B62J 19/00; B62J 23/00; B65D 85/68; B65D 2585/6862; Y10T 403/32409; Y10T 403/32081
USPC .................. 280/278, 287; 206/335; 150/167
See application file for complete search history.

(56) References Cited

U.S. PATENT DOCUMENTS

| | | | | |
|---|---|---|---|---|
| 531,121 | A * | 12/1894 | Hofbeck | A47B 3/0912 280/287 |
| 604,743 | A * | 5/1898 | Evans | B62K 15/006 280/287 |
| 607,325 | A * | 7/1898 | Barnes | B62K 15/006 280/287 |
| 1,287,130 | A * | 12/1918 | Starenberg | B62K 15/006 280/287 |
| 3,865,403 | A * | 2/1975 | Majerus | B62K 15/008 280/287 |
| 4,353,464 | A * | 10/1982 | Bentler | B65D 85/68 206/303 |
| 4,440,414 | A | 4/1984 | Wang | |
| 4,441,729 | A | 4/1984 | Underwood | |
| 4,842,292 | A | 6/1989 | Wang | |
| 5,149,119 | A | 9/1992 | Hwang | |
| 5,178,583 | A * | 1/1993 | Rankin | B64G 9/00 403/100 |
| 5,205,573 | A | 4/1993 | Mhedhbi | |
| 5,398,955 | A | 3/1995 | Yeh | |
| 5,520,280 | A * | 5/1996 | Lickton | B65D 85/68 190/18 A |
| 6,116,629 | A | 9/2000 | Koppensteiner | |
| 6,241,630 | B1 * | 6/2001 | Alberti | A63B 61/02 403/102 |
| 6,363,550 | B1 * | 4/2002 | Wang | A47D 13/063 403/102 |
| 6,371,873 | B1 * | 4/2002 | Wang | A63B 63/004 273/407 |
| D666,536 | S | 9/2012 | Uimonen | |
| 9,410,343 | B2 * | 8/2016 | Hotes | E04H 15/48 |

(Continued)

*Primary Examiner* — Anne Marie M Boehler

(57) ABSTRACT

A foldable velocipede for ease of stowage includes a bicycle that comprises a frame. The frame has a top tube and a down tube. The top tube and the down tube each comprise a front section and a rear section. Each of a pair of rotators is coupled to and extends between a respective front section and an associated rear section. The rotators are selectively positionable in extended configurations, wherein each front section extends linearly from an associated rear section and the bicycle is configured for riding. The top tube and the down tube also are selectively positionable in folded configurations, wherein each front section is positioned substantially adjacent to an associated rear section and the bicycle is configured for stowage. The improvement is the pair of rotators that is positioned singly in the top tube and the down tube such that the bicycle is reversibly foldable.

15 Claims, 5 Drawing Sheets

(56) References Cited

U.S. PATENT DOCUMENTS

2003/0086752 A1* 5/2003 Lemole .................. B60J 7/1204
                                                                403/102
2007/0120342 A1    5/2007 Daniels

* cited by examiner

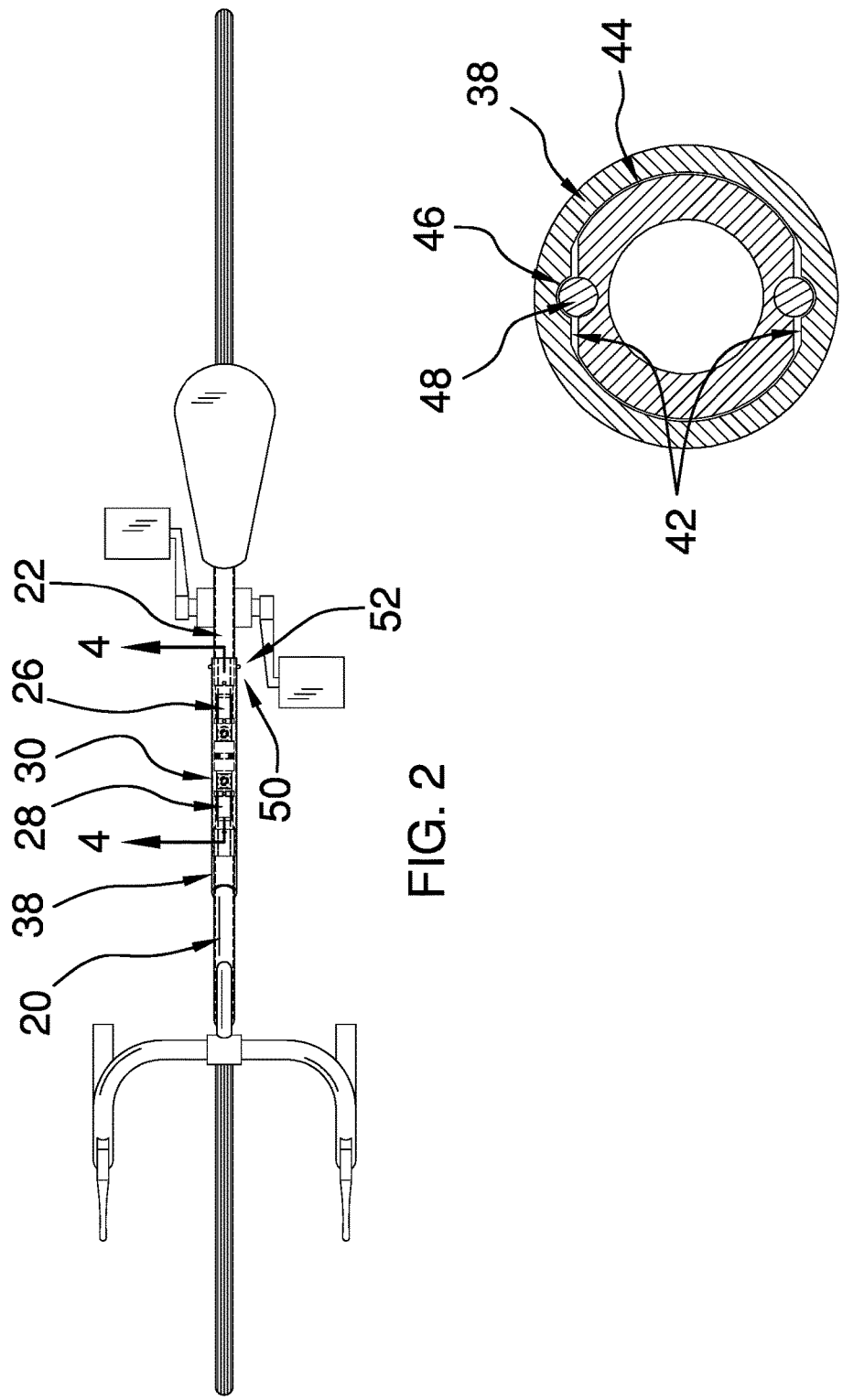

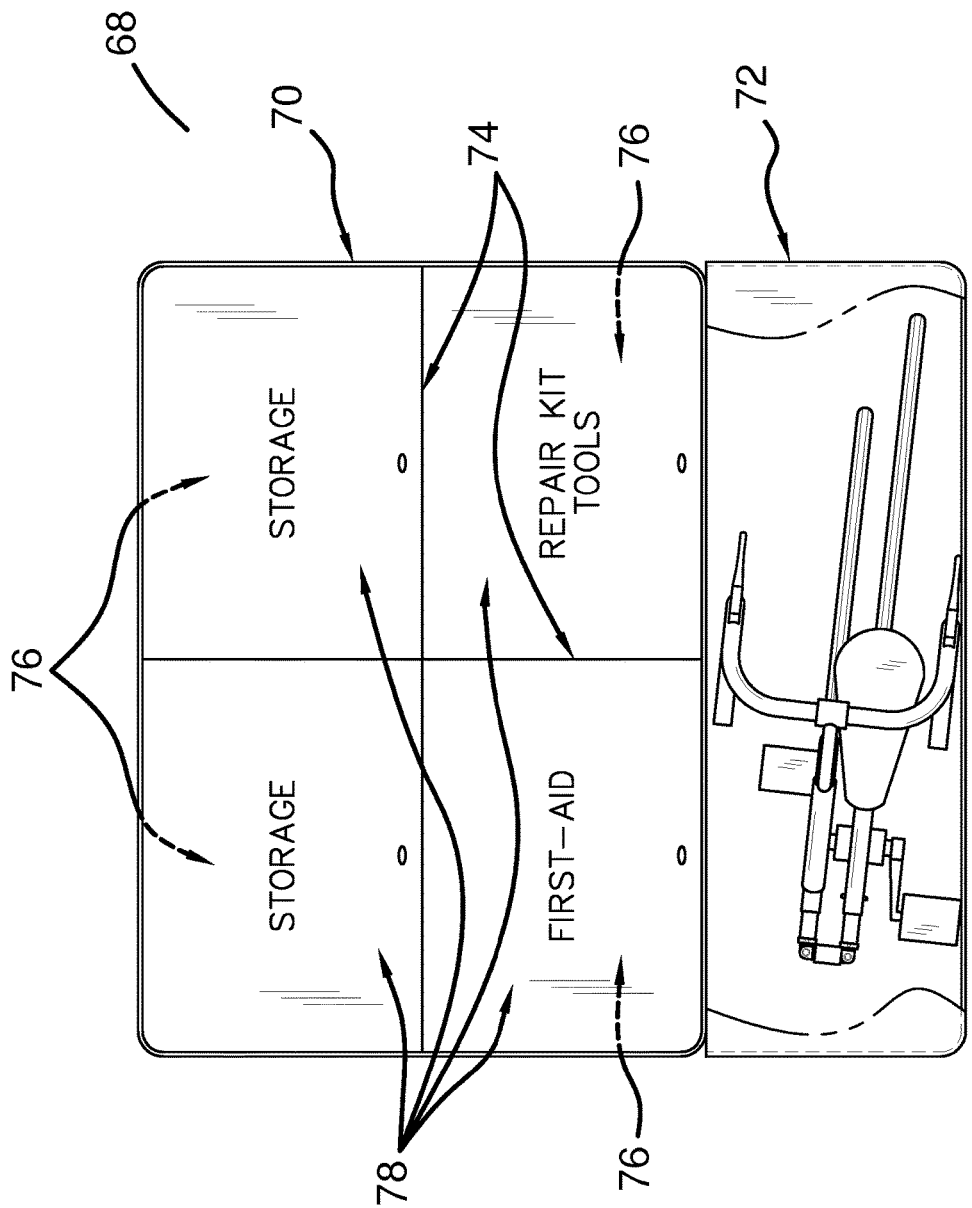

FOLDABLE VELOCIPEDE

BACKGROUND OF THE DISCLOSURE

Field of the Disclosure

The disclosure relates to velocipedes and more particularly pertains to a new velocipede that is foldable for ease of stowage.

SUMMARY OF THE DISCLOSURE

An embodiment of the disclosure meets the needs presented above by generally comprising a bicycle that comprises a frame. The frame has a top tube and a down tube. The top tube and the down tube each comprise a front section and a rear section. Each of a pair of rotators is coupled to and extends between a respective front section and an associated rear section. The rotators are selectively positionable in extended configurations, wherein each front section extends linearly from an associated rear section and the bicycle is configured for riding. The top tube and the down tube also are selectively positionable in folded configurations, wherein each front section is positioned substantially adjacent to an associated rear section and the bicycle is configured for stowage. The improvement is the pair of rotators that is positioned singly in the top tube and the down tube such that the bicycle is reversibly foldable.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a cross-sectional view of an embodiment of the disclosure.

FIG. 6 is a top view of an embodiment of the disclosure.

DESCRIPTION OF THE PREFERRED EMBODIMENT

Figure 1:
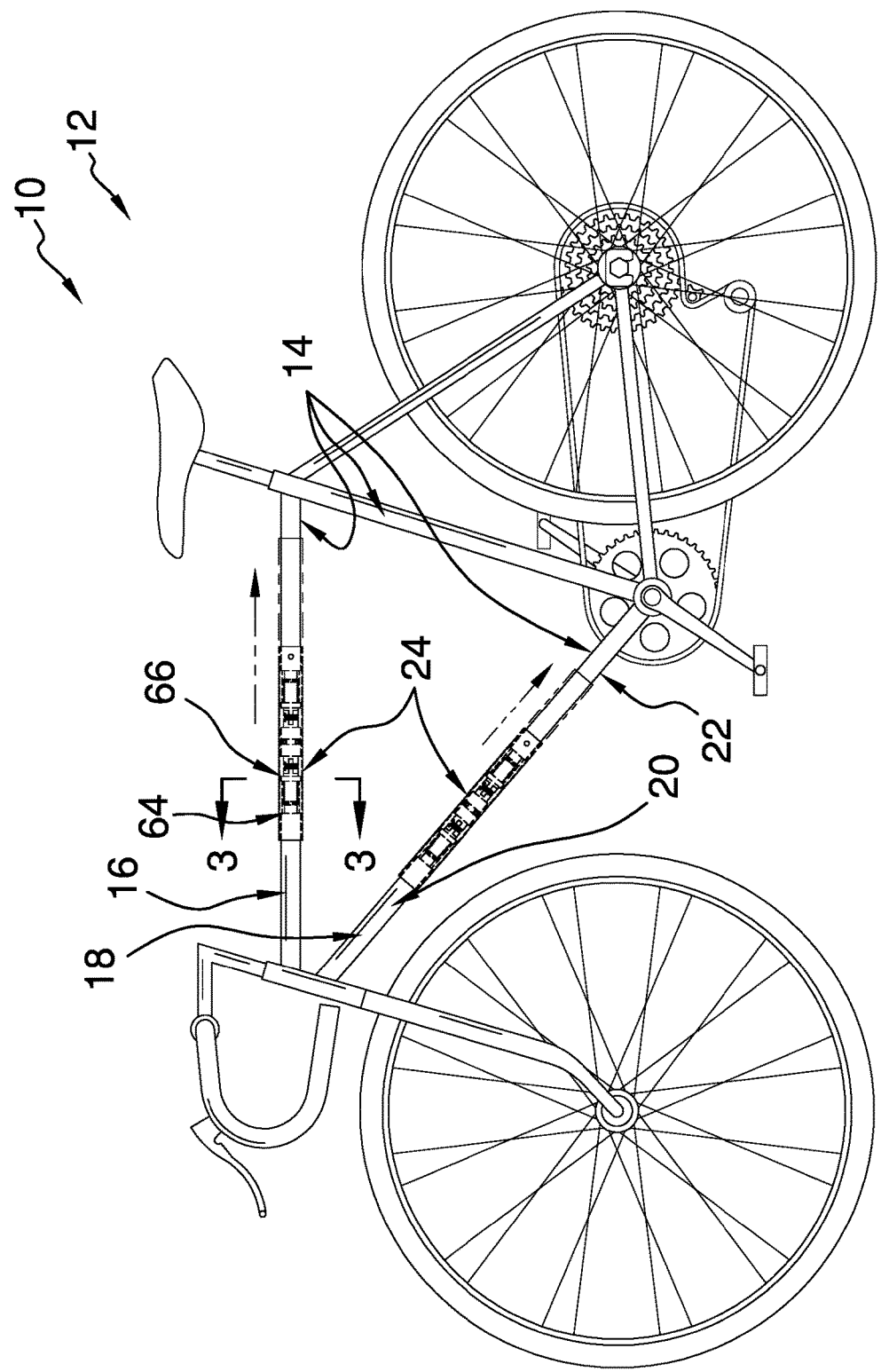
FIG. 1 is a side view of a foldable velocipede according to an embodiment of the disclosure.
Figure 4:
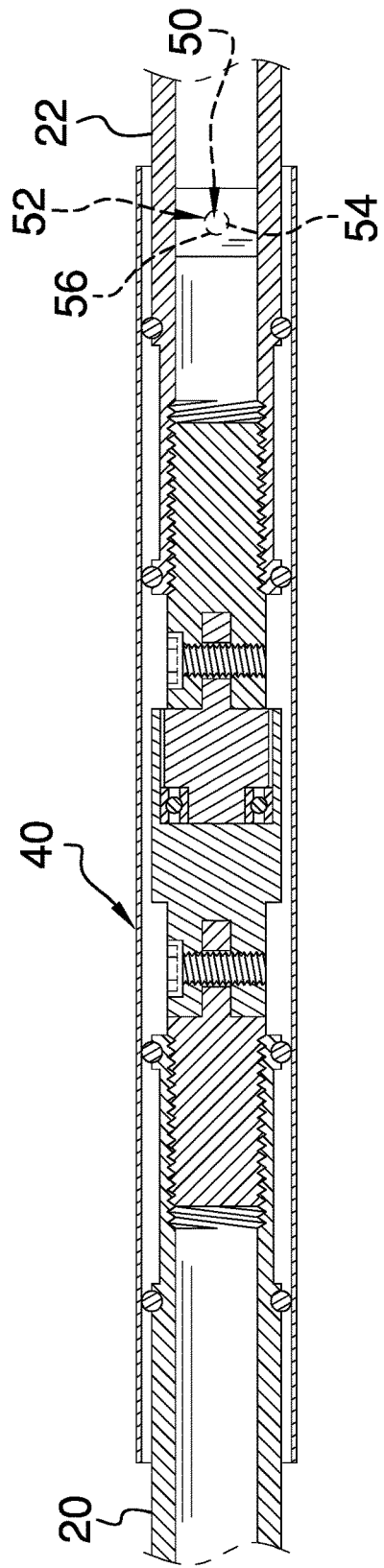
FIG. 4 is a cross-sectional view of an embodiment of the disclosure.
Figure 5:
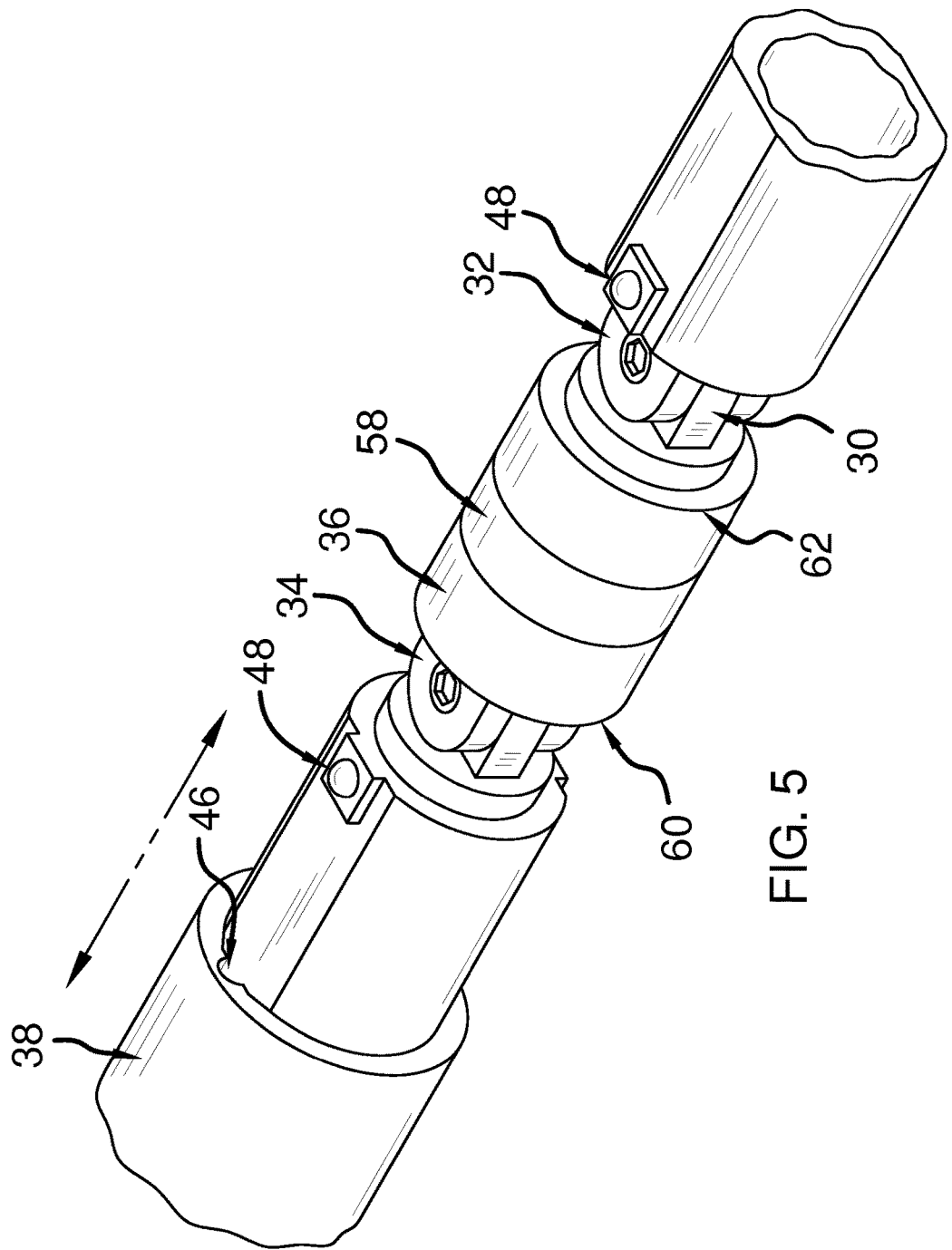
FIG. 5 is a detail view of an embodiment of the disclosure.

With reference now to the drawings, and in particular to FIGS. 1 through 6 thereof, a new velocipede embodying the principles and concepts of an embodiment of the disclosure and generally designated by the reference numeral 10 will be described.

As best illustrated in FIGS. 1 through 6, the foldable velocipede 10 generally comprises a bicycle 12 that comprises a frame 14. The frame 14 has a top tube 16 and a down tube 18. The top tube 16 and the down tube 18 each comprise a front section 20 and a rear section 22.

Each of a pair of rotators 24 is coupled to and extends between a respective front section 20 and an associated rear section 22. The rotators 24 are positioned in the top tube 16 and the down tube 18 such that the top tube 16 and the down tube 18 are selectively positionable in extended configurations. In the extended configuration, each front section 20 extends linearly from an associated rear section 22 and the bicycle 12 is configured for riding. The top tube 16 and the down tube 18 also are selectively positionable in folded configurations. In the folded configuration, each front section 20 is positioned substantially adjacent to an associated rear section 22 and the bicycle 12 is configured for stowage. The pair of rotators 24 is substantially vertically aligned within said frame 14.

In one embodiment, each rotator 24 comprises a first rod 26, a second rod 28 and a plurality of hinges 30. The first rod 26 is coupled to and is positioned in the rear section 22. The second rod 28 is coupled to and is positioned in the front section 20. The hinges 30 are linearly coupled. The plurality of hinges 30 is coupled to and extends between the first rod 26 and the second rod 28. In another embodiment, the first rod 26 is threadedly coupled to the rear section 22 and the second rod 28 is threadedly coupled to the front section 20. In yet another embodiment, the plurality of hinges 30 comprises a first hinge 32, which is coupled to the first rod 26, and a second hinge 34, which is coupled to the second rod 28.

In one embodiment, a third rod 36 is coupled to and extends between the first hinge 32 and the second hinge 34. The third rod 36 is positioned on the first hinge 32 such that the third rod 36 is positioned to displace the front section 20 horizontally from the rear section 22 as the bicycle 12 is folded.

In one embodiment, each rotator 24 comprises a pipe 38 that is complementary to the front section 20 and the rear section 22. The pipe 38 is positioned around the rear section 22. The pipe 38 is selectively slidably positionable over the front section 20 such that a midpoint 40 of the pipe 38 is positioned substantially equally distant from the front section 20 and the rear section 22. The pipe 38 is positionable over the front section 20 such that the front section 20 is fixedly positioned linearly with the rear section 22.

In another embodiment, the pipe 38 comprises a pair of opposing flat sections 42 that is positioned on an internal surface 44 of the pipe 38. Each of a pair of channels 46 is positioned longitudinally in a respective opposing flat section 42 of the pipe 38. Each of a plurality of balls 48 is rotationally coupled to the front section 20 and the rear section 22. The balls 48 are complementary to the channels 46. The balls 48 are positioned on the front section 20 and the rear section 22 such that the balls 48 are positioned to engage the channels 46 as the pipe 38 is reversibly positioned over the front section 20. The pipe 38 is restricted from rotation relative to the front section 20 and the rear section 22.

A first coupler 50 is coupled to the rear section 22. A second coupler 52 is coupled to the pipe 38. The second coupler 52 is complementary to the first coupler 50. The first coupler 50 is positioned in the rear section 22 such that the first coupler 50 is positioned to reversibly couple to the second coupler 52 to couple the pipe 38 to the rear section 22. Thus positioned, the midpoint 40 of the pipe 38 is positioned substantially equally distant from the front section 20 and the rear section 22. In one embodiment, the first coupler 50 comprises a pair of pins 54 that is positioned in and extendable from the rear section 22. The pins 54 are spring loaded. The second coupler 52 comprises a pair of holes 56 that is positioned through the pipe 38. Each pin 54 is selectively insertable through an associated hole 56 to couple the pipe 38 to the rear section 22.

A bearing 58 is positioned in the rotator 24 that is positioned in the down tube 18. The bearing 58 is positioned in the rotator 24 such that the front section 20 is rotationally coupled to the rear section 22. The front section 20 is rotatable relative to the rear section 22 as the bicycle 12 is reversibly folded. In one embodiment, the bearing 58 is positioned in the third rod 36 such that a first endpoint 60 of the third rod 36 is rotatable relative to a second endpoint 62 of the third rod 36. In another embodiment. The bearing 58 is positioned in the second rod 28 such that a first end 64 of the second rod 28 is rotatable relative to a second end 66 of the second rod 28.

The present invention also comprises a housing 68. The housing 68 comprises an upper shell 70 that is hingedly coupled to a lower shell 72. The upper shell 70 is reversibly couplable to the lower shell 72 such that the housing 68 is reversibly closable. The housing 68 is configured for stowage of the bicycle 12 when the bicycle 12 is folded.

In one embodiment, a plurality of partitions 74 is coupled to and is positioned in the upper shell 70. The partitions 74 define a plurality of compartments 76. In another embodiment, the plurality of compartments 76 comprises four compartments 76. Each of a plurality of lids 78 is positioned to couple to the upper shell 70 and a respective partition 74 to close a respective compartment 76. Each compartment 76 is positioned in the upper shell 70 such that the compartments 76 are configured for storage of items. The lower shell 72 is configured for stowage of the bicycle 12 when the bicycle 12 is folded.

In use, the rotators 24 are positioned in the top tube 16 and the down tube 18 such that the top tube 16 and the down tube 18 are selectively positionable in extended configurations. In the extended configuration, each front section 20 extends linearly from an associated rear section 22 and the bicycle 12 is configured for riding. The top tube 16 and the down tube 18 also are selectively positionable in folded configurations. In the folded configuration, each front section 20 is positioned substantially adjacent to an associated rear section 22 and the bicycle 12 is configured for stowage. Each pipe 38 is positionable over an associated front section 20 such that the associated front section 20 is fixedly positioned linearly with an associated rear section 22. Each compartment 76 is positioned in the upper shell 70 such that the compartments 76 are configured for storage of items. The lower shell 72 is configured for stowage of the bicycle 12 when the bicycle 12 is folded.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A foldable velocipede comprising:
   a bicycle comprising a frame having a top tube and a down tube, said top tube and said down tube each comprising a front section and a rear section;
   a pair of rotators, each said rotator being coupled to and extending between a respective said front section and an associated said rear section, wherein said rotators are positioned in said top tube and said down tube such that said top tube and said down tube are selectively positionable in extended configurations wherein each said front section extends linearly from an associated said rear section, such that said bicycle is configured for riding, and folded configurations wherein each said front section is positioned substantially adjacent to an associated said rear section such that said bicycle is configured for stowage;
   said pair of rotators being positioned in said top tube and said down tube such that said bicycle is reversibly foldable;
   each said rotator comprising
      a first rod coupled to and positioned in said rear section,
      a second rod coupled to and positioned in said front section,
      a plurality of hinges, said hinges being linearly coupled, said plurality of hinges being coupled to and extending between said first rod and said second rod,
      a pipe complementary to said front section and said rear section, said pipe being positioned around said rear section, said pipe being selectively slidably positionable over said front section such that a midpoint of said pipe is positioned substantially equally distant from said front section and said rear section, and
      wherein said pipe is positionable over said front section such that said front section is fixedly positioned linearly with said rear section;
   said pipe comprising a pair of opposing flat sections positioned on an internal surface of said pipe;
   a pair of channels, each said channel being positioned longitudinally in a respective said opposing flat section of said pipe;
   a plurality of balls, said balls being complementary to said channels, said balls being rotationally coupled to said front section and said rear section; and
   wherein said balls are positioned on said front section and said rear section such that said balls are positioned to engage said channels as said pipe is reversibly positioned over said front section such that said pipe is restricted from rotation relative to said front section and said rear section.

2. The velocipede of claim 1, further including said pair of rotators being substantially vertically aligned within said frame.

3. The velocipede of claim 1, further including said first rod being threadedly coupled to said rear section, said second rod being threadedly coupled to said front section.

4. The velocipede of claim 1, further including said plurality of hinges comprising:

a first hinge coupled to said first rod; and
a second hinge coupled to said second rod.

5. The velocipede of claim 4, further including a third rod coupled to and extending between said first hinge and said second hinge, wherein said third rod is positioned on said first hinge such that said third rod is positioned to displace said front section horizontally from said rear section as said bicycle is folded.

6. The velocipede of claim 1, further comprising:
a first coupler coupled to said rear section;
a second coupler coupled to said pipe, said second coupler being complementary to said first coupler; and
wherein said first coupler is positioned in said rear section such that said first coupler is positioned to reversibly couple to said second coupler to couple said pipe to said rear section with said midpoint of said pipe positioned substantially equally distant from said front section and said rear section.

7. The velocipede of claim 6, further comprising:
said first coupler comprising a pair of pins positioned in and extendable from said rear section;
said second coupler comprising a pair of holes positioned through said pipe; and
wherein each said pin is selectively insertable through an associated said hole to couple said pipe to said rear section.

8. The velocipede of claim 1, further including a housing comprising an upper shell hingedly coupled to a lower shell, said upper shell being reversibly couplable to said lower shell such that said housing is reversibly closable, wherein said housing is configured for stowage of said bicycle when said bicycle is folded.

9. The velocipede of claim 8, further comprising:
a plurality of partitions coupled to and positioned in said upper shell defining a plurality of compartments;
a plurality of lids, each said lid being positioned to couple to said upper shell and a respective said partition to close a respective said compartment; and
wherein each said compartment is positioned in said upper shell such that said compartments are configured for storage of items, and wherein said lower shell is configured for stowage of said bicycle when said bicycle is folded.

10. The velocipede of claim 9, further including said plurality of compartments comprising four said compartments.

11. A foldable velocipede comprising:
a bicycle comprising a frame having a top tube and a down tube, said top tube and said down tube each comprising a front section and a rear section;
a pair of rotators, each said rotator being coupled to and extending between a respective said front section and an associated said rear section, wherein said rotators are positioned in said top tube and said down tube such that said top tube and said down tube are selectively positionable in extended configurations wherein each said front section extends linearly from an associated said rear section, such that said bicycle is configured for riding, and folded configurations wherein each said front section is positioned substantially adjacent to an associated said rear section such that said bicycle is configured for stowage;
said pair of rotators being positioned in said top tube and said down tube such that said bicycle is reversibly foldable;
each said rotator comprising
a first rod coupled to and positioned in said rear section,
a second rod coupled to and positioned in said front section,
a plurality of hinges, said hinges being linearly coupled, said plurality of hinges being coupled to and extending between said first rod and said second rod,
a pipe complementary to said front section and said rear section, said pipe being positioned around said rear section, said pipe being selectively slidably positionable over said front section such that a midpoint of said pipe is positioned substantially equally distant from said front section and said rear section, and
wherein said pipe is positionable over said front section such that said front section is fixedly positioned linearly with said rear section;
said plurality of hinges comprising a first hinge coupled to said first rod and a second hinge coupled to said second rod;
a third rod coupled to and extending between said first hinge and said second hinge, wherein said third rod is positioned on said first hinge such that said third rod is positioned to displace said front section horizontally from said rear section as said bicycle is folded; and
a bearing positioned in said rotator positioned in said down tube, wherein said bearing is positioned in said rotator such that said front section is rotationally coupled to said rear section, wherein said front section is rotatable relative to said rear section as said bicycle is reversibly folded.

12. The velocipede of claim 11, further including said bearing being positioned in said third rod such that a first endpoint of said third rod is rotatable relative to second endpoint of said third rod.

13. The velocipede of claim 11, further including said bearing being positioned in said second rod such that a first end of said second rod is rotatable relative to second end of said second rod.

14. A foldable velocipede comprising:
a bicycle comprising a frame having a top tube and a down tube, said top tube and said down tube each comprising a front section and a rear section;
a pair of rotators, each said rotator being coupled to and extending between a respective said front section and an associated said rear section, wherein said rotators are positioned in said top tube and said down tube such that said top tube and said down tube are selectively positionable in extended configurations wherein each said front section extends linearly from an associated said rear section, such that said bicycle is configured for riding and folded configurations wherein each said front section is positioned substantially adjacent to an associated said rear section such that said bicycle is configured for stowage, each said rotator comprising:
a first rod coupled to and positioned in said rear section, said first rod being threadedly coupled to said rear section,
a second rod coupled to and positioned in said front section, said second rod being threadedly coupled to said front section,
a plurality of hinges, said hinges being linearly coupled, said plurality of hinges being coupled to and extending between said first rod and said second rod, said plurality of hinges comprising a first hinge coupled to said first rod and a second hinge coupled to said second rod, and
a pipe complementary to said front section and said rear section, said pipe being positioned around said rear section, said pipe being selectively slidably positionable over said front section such that a midpoint of said pipe is positioned substantially equally distant from said front section and said rear section, wherein said pipe is positionable over said front section such that said front section is fixedly positioned linearly with said rear section, said pipe comprising a pair of opposing flat sections positioned on an internal surface of said pipe;

a pair of channels, each said channel being positioned longitudinally in a respective said opposing flat section of said pipe;

a plurality of balls, said balls being complementary to said channels, said balls being rotationally coupled to said front section and said rear section, wherein said balls are positioned on said front section and said rear section such that said balls are positioned to engage said channels as said pipe is reversibly positioned over said front section such that said pipe is restricted from rotation relative to said front section and said rear section;

a first coupler coupled to said rear section;

a second coupler coupled to said pipe, said second coupler being complementary to said first coupler, wherein said first coupler is positioned in said rear section such that said first coupler is positioned to reversibly couple to said second coupler to couple said pipe to said rear section with said midpoint of said pipe positioned substantially equally distant from said front section and said rear section, said first coupler comprising a pair of pins positioned in and extendable from said rear section, said second coupler comprising a pair of holes positioned through said pipe, wherein each said pin is selectively insertable through an associated said hole to couple said pipe to said rear section;

a third rod coupled to and extending between said first hinge and said second hinge, wherein said third rod is positioned on said first hinge such that said third rod is positioned to displace said front section horizontally from said rear section as said bicycle is folded;

a bearing positioned in said rotator positioned in said down tube, wherein said bearing is positioned in said rotator such that said front section is rotationally coupled to said rear section, wherein said front section is rotatable relative to said rear section as said bicycle is reversibly folded, said bearing being positioned in said third rod such that a first endpoint of said third rod is rotatable relative to second endpoint of said third rod;

a housing comprising an upper shell hingedly coupled to a lower shell, said upper shell being reversibly couplable to said lower shell such that said housing is reversibly closable, wherein said housing is configured for stowage of said bicycle when said bicycle is folded;

a plurality of partitions coupled to and positioned in said upper shell defining a plurality of compartments, said plurality of compartments comprising four said compartments;

a plurality of lids, each said lid being positioned to couple to said upper shell and a respective said partition to close a respective said compartment, wherein each said compartment is positioned in said upper shell such that said compartments are configured for storage of items, and wherein said lower shell is configured for stowage of said bicycle when said bicycle is folded; and wherein said rotators are positioned in said top tube and said down tube such that said top tube and said down tube are selectively positionable in extended configurations wherein each said front section extends linearly from an associated said rear section, such that said bicycle is configured for riding and folded configurations wherein each said front section is positioned substantially adjacent to an associated said rear section such that said bicycle is configured for stowage, wherein each said pipe is positionable over an associated said front section such that said associated said front section is fixedly positioned linearly with said associated said rear section, wherein each said compartment is positioned in said upper shell such that said compartments are configured for storage of items, and wherein said lower shell is configured for stowage of said bicycle when said bicycle is folded.

15. The velocipede of claim 14, further including said bearing being positioned in said second rod such that a first end of said second rod is rotatable relative to a second end of said second rod.

* * * * *